(12) United States Patent
Lesso

(10) Patent No.: US 9,917,508 B2
(45) Date of Patent: Mar. 13, 2018

(54) CHARGE PUMP CIRCUIT AND METHODS OF OPERATION THEREOF

(71) Applicant: Cirrus Logic International Semiconductor Ltd., Edinburgh (GB)

(72) Inventor: John P. Lesso, Edinburgh (DE)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 14/988,446

(22) Filed: Jan. 5, 2016

(65) Prior Publication Data

US 2016/0126834 A1    May 5, 2016

Related U.S. Application Data

(60) Continuation of application No. 13/854,707, filed on Apr. 1, 2013, now Pat. No. 9,236,794, which is a continuation of application No. 13/151,987, filed on Jun. 2, 2011, now Pat. No. 8,427,851, which is a division of application No. 12/000,546, filed on Dec. 13, 2007, now Pat. No. 7,990,742.

(30) Foreign Application Priority Data

Dec. 22, 2006 (GB) .................... 0625956.8

(51) Int. Cl.
*H02M 3/07* (2006.01)

(52) U.S. Cl.
CPC ........ *H02M 3/07* (2013.01); *H02M 2003/072* (2013.01)

(58) Field of Classification Search
CPC ......... H02M 3/072; H02M 3/071; H02M 3/07
See application file for complete search history.

(56) References Cited

U.S. PATENT DOCUMENTS

| 3,772,606 | A |   | 11/1973 | Waehner |   |
|---|---|---|---|---|---|
| 4,054,843 | A |   | 10/1977 | Hamada et al. |   |
| 4,115,739 | A |   | 9/1978 | Sano et al. |   |
| 4,409,559 | A |   | 10/1983 | Amada et al. |   |
| 4,430,625 | A |   | 2/1984 | Yokoyama et al. |   |
| 4,888,677 | A | * | 12/1989 | Grimm | H02M 3/07 307/110 |
| 5,075,643 | A |   | 12/1991 | Einbinder |   |

(Continued)

FOREIGN PATENT DOCUMENTS

| EP | 0 585 925 | 3/1994 |
|---|---|---|
| EP | 1 569 330 | 8/2005 |

(Continued)

OTHER PUBLICATIONS

"100mA Regulated Charge-Pump Inverters in ThinSOT", LTC 1983-3/LTC 1983-5, pp. 1-12, Linear Technology Corporation 2002.

(Continued)

*Primary Examiner* — Harry Behm
(74) *Attorney, Agent, or Firm* — Blank Rome LLP

(57) ABSTRACT

A charge pump circuit, and associated method and apparatuses, for providing a split-rail voltage supply, the circuit having a network of switches that is operable in a number of different states and a controller for operating the switches in a sequence of said states so as to generate positive and negative output voltages together spanning a voltage approximately equal to the input voltage and centered on the voltage at the common terminal.

19 Claims, 11 Drawing Sheets

(56) References Cited

U.S. PATENT DOCUMENTS

| | | |
|---|---|---|
| 5,289,137 A | 2/1994 | Nodar et al. |
| 5,442,317 A | 8/1995 | Stengel |
| 5,461,557 A | 10/1995 | Tamagawa |
| 5,463,542 A | 10/1995 | Okamoto |
| 5,532,916 A | 7/1996 | Tamagawa et al. |
| 5,606,491 A | 2/1997 | Ellis |
| 5,760,637 A | 6/1998 | Wong et al. |
| 5,898,340 A | 4/1999 | Chatterjee et al. |
| 6,084,789 A | 7/2000 | Van Lieshout |
| 6,166,605 A | 12/2000 | Carver |
| 6,198,645 B1 | 3/2001 | Kotowski et al. |
| 6,329,800 B1 | 12/2001 | May |
| 6,373,340 B1 | 4/2002 | Shashoua et al. |
| 6,438,005 B1 | 8/2002 | Walter |
| 6,504,422 B1 | 1/2003 | Rader et al. |
| 6,563,235 B1 | 5/2003 | McIntyre et al. |
| 6,825,726 B2 | 11/2004 | French et al. |
| 6,828,845 B2 | 12/2004 | Pennock et al. |
| 6,922,097 B2 | 7/2005 | Chan et al. |
| 7,030,699 B2 | 4/2006 | Richard et al. |
| 7,099,167 B2 | 8/2006 | Fujise |
| 7,183,857 B2 | 2/2007 | Doy et al. |
| 2004/0246050 A1 | 12/2004 | Kikuchi |
| 2005/0285682 A1 | 12/2005 | Lee et al. |
| 2006/0120157 A1 | 6/2006 | Albano et al. |
| 2008/0044041 A1 | 2/2008 | Tucker et al. |
| 2008/0116979 A1 | 5/2008 | Lesso et al. |
| 2008/0150619 A1 | 6/2008 | Lesso et al. |
| 2008/0150621 A1 | 6/2008 | Lesso et al. |
| 2008/0159567 A1 | 7/2008 | Lesso et al. |
| 2008/0298605 A1* | 12/2008 | Fan ............ H03F 1/0211 381/74 |
| 2009/0326624 A1* | 12/2009 | Melse ............ A61N 1/378 607/116 |

FOREIGN PATENT DOCUMENTS

| | | |
|---|---|---|
| GB | 2 418 792 | 4/2006 |
| JP | 7-240636 | 9/1995 |
| JP | 8-191224 | 7/1996 |
| JP | 2001-185960 | 7/2001 |
| JP | 2002-198750 | 7/2002 |
| JP | 2005-260581 | 9/2005 |
| WO | WO 01/78248 | 10/2001 |
| WO | WO 03/096520 | 11/2003 |
| WO | WO 2004/019485 | 3/2004 |
| WO | WO 2005/101627 | 10/2005 |
| WO | WO 2006/031304 | 3/2006 |
| WO | WO 2008/024665 A2 | 2/2008 |

OTHER PUBLICATIONS

"Design Trade Offs for Single-Supply Op Amps" http://www.maxim-ic.com/an656 Dallas Semiconductor Maxim Application Note 656, Maxim Integrated Products 2005.

"Dual Power JFET-Input Operational Amplifier With Switched-Capacitor Voltage Converter", TLE2662, Texas Instruments, pp. 1, 2, 10, 25 (1994).

* cited by examiner

CHARGE PUMP CIRCUIT AND METHODS OF OPERATION THEREOF

The present invention relates to charge pump circuits and in particular charge pump circuits which provide dual rail output voltages.

Charge pump circuits are known in the art. These circuits are a type of DC-DC converter which use capacitors as energy storage device and are able to provide a power source at a higher or lower voltage than that obtained from an input source. Charge pump circuits are capable of high efficiencies, sometimes as high as 90-95%.

Charge pumps use some form of switching device(s) to control the connection of the capacitors to voltage sources and to one another, to typically obtain voltages other than the input voltage value. The charge pump includes a capacitor, typically known as a "flying capacitor", for transferring charge to one or more output capacitors, which will be referred to as "reservoir capacitors". Such charge pumps can be used to generate dual rail, that is bipolar, supply voltages from a single rail input voltage VDD. A drawback with known dual rail charge pumps is that they may, for example, produce an output voltage having a magnitude twice the input voltage (VDD), that is, one rail is at a voltage VDD, the other at a voltage −VDD, with reference to a common terminal. This can be very inefficient if such a charge pump is used, for example, to power circuitry that amplifies a signal that has a maximum amplitude much smaller than the amplifier circuitry's power supply +1−VDD. In such a case most of the output power (and therefore input power) is wasted in producing heat as opposed to driving the signal. However, of course, it is sometimes advantageous to be able to select this full output range when desired.

It is an aim of the present invention to address the above mentioned drawback.

In a first aspect of the invention there is provided a charge pump circuit for providing a split-rail voltage supply, the circuit having:
  a common terminal
  an input supply terminal for connection to a supply at an input voltage relative to the common terminal,
  first and second output terminals for carrying the split-rail supply, the output terminals in use being connected to the common terminal via respective first and second loads and also via respective first and second reservoir capacitors,
  first and second flying capacitor terminals for connection to a first flying capacitor,
  third and fourth flying capacitor terminals for connection to a second flying capacitor,
  a network of switches interconnecting the terminals and being operable in a number of different states and
  a controller for operating the switches in a sequence of the states, the sequence being adapted repeatedly to transfer packets of charge to the reservoir capacitors via the flying capacitors and thereby generating a the split rail supply with positive and negative output voltages together spanning a voltage approximately equal to the input voltage, and centered on the voltage at the common terminal, wherein
  the different states include a state in which one or both reservoir capacitors are charged by the input supply and a state in which the first and second reservoir capacitors are substantially simultaneously charged using one or both of the first or second reservoir capacitors.

It should be noted that the term "together spanning a voltage approximately equal to the input voltage, and substantially centered on the voltage at the common terminal", should be taken, for example, to cover the situation when the circuit is lightly loaded, wherein the output voltages levels will, in reality, be +/−half the input voltages less Iload·Rload, where Iload equals the load current and Rload equals the load resistance.

The controller may be adapted to operate the switches in a sequence which interleaves repetitions of first and second states, the first state being effective to divide the input voltage between the first and second flying capacitors, the second state being effective to apply each flying capacitor's portion of the divided voltage across a respective one of the reservoir capacitors. The switch network may be operable such that when the circuit is in the first state, the first and fourth flying capacitor terminals are connected to the input terminal and the common terminal respectively while the second and third flying capacitor terminals are connected together, and when the circuit is in the second state, the first and second flying capacitor terminals are connected to the first output terminal and the common terminal respectively, and the third and fourth flying capacitor terminals are connected to the common terminal and the second output terminal respectively or alternatively the third and fourth flying capacitor terminals are connected to the first output terminal and the common terminal respectively, and the first and second flying capacitor terminals are connected to the common terminal and the second output terminal respectively. In one embodiment the second state is such that the first and second flying capacitor terminals are connected to the first output terminal and the common terminal respectively and the third and fourth flying capacitor terminals are connected to the common terminal and the second output terminal respectively.

The switch network may be further operable in a third state in which the first and second flying capacitors are connected in series, and the controller is adapted to include repetitions of the third state within the sequence. In the third state, the first and second flying capacitor terminals may be connected to the third and fourth flying capacitor terminals respectively. The controller may be adapted to include the third state less frequently than the first and second states.

The controller may be adapted to operate the switches in a sequence which interleaves repetitions of fourth and sixth states, the fourth state being effective to charge up the first flying capacitor to the input voltage, the sixth state being effective to divide the voltage on the first flying capacitor between the first reservoir capacitor and second reservoir capacitor in series. In the fourth state, the first and second flying capacitor terminals may be connected to the input terminal and the common terminal respectively, and when in the sixth state, the first and second flying capacitor terminals may be connected to the first output terminal and the second output terminal respectively.

The controller may be adapted to operate the switches in a sequence which interleaves repetitions of fifth and seventh states, the fifth state being effective to charge up the second flying capacitor to the input voltage, the seventh state being effective to divide the voltage on the second flying capacitor between the first reservoir capacitor and second reservoir capacitor in series. In the fifth state, the third and fourth flying capacitor terminals may be connected to the input terminal and the common terminal respectively, and when in the seventh state, the third and fourth flying capacitor terminals may be connected to the first output terminal and the second output terminal respectively.

The controller may be adapted to vary the sequence of states according to load conditions. The variation in the sequence of states may include lowering the frequency of inclusion of the second state should the load be asymmetrical. The split-rail voltage supply may be arranged to operate in a closed loop configuration.

The circuit may be arranged such that the first reservoir capacitor is charged only when the voltage at the first output terminal falls below a first threshold value and the second reservoir capacitor is charged only when the voltage at the second output terminal falls below a second threshold value. Alternatively the circuit may be arranged such that the first reservoir capacitor and the second reservoir capacitor are both charged only when either the voltage at the first output terminal falls below a first threshold value or the voltage at the second output terminal falls below a second threshold value. The circuit may further comprise at least one comparator for comparing the voltage at each of the output terminals with at least one reference voltage. At least one reference voltage may be settable by a user therefore controlling the voltage levels at the first and second output terminals.

The circuit may further comprise an input selector for selecting a signal to be input into the input supply terminal, depending on a control signal therefore controlling the voltage levels at the first and second output terminals.

The switch network may be operable to connect the first flying capacitor terminal independently to any of the input terminal, the first output terminal and the third flying capacitor terminal. The switch network may be operable to connect the second flying capacitor terminal independently to any of the common terminal, the third flying capacitor terminal and the second output terminal. The switch network may be operable to connect the third flying capacitor terminal independently to any of the input terminal, the common terminal, and the second flying capacitor terminal. The switch to connect the fourth flying capacitor terminal independently to any of the common terminal, the second flying capacitor terminal and the second output terminal.

The switch network may comprise the following switches operable by the controller:
   a first switch for connecting the input terminal to the first flying capacitor terminal,
   a second switch for connecting the first flying capacitor terminal to the first output terminal,
   a third switch for connecting the first flying capacitor terminal to the third flying capacitor terminal,
   a fourth switch for connecting the second flying capacitor terminal to the common terminal,
   a fifth switch for connecting the second flying capacitor terminal to the third flying capacitor terminal,
   a sixth switch for connecting the second flying capacitor terminal to the fourth flying capacitor terminal,
   a seventh switch for connecting the fourth flying capacitor terminal to the common terminal, and
   an eighth switch for connecting the fourth flying capacitor terminal to the second output terminal.

The controller may be operable to control the network to generate the split rail supply with positive and negative output voltages together spanning a voltage approximately equal to the input voltage, and centered on the voltage at the common terminal when it is operating in a first mode, the circuit may be further operable in a second mode to yield positive and negative output voltages each up to substantially the input voltage across the intermediate supply terminals The controller may be adapted in the second mode to operate the switches in a sequence which interleaves repetitions of at least second, and eighth states, the eighth state being effective to charge the first and second flying capacitor and the first reservoir capacitor substantially to the input voltage, the second state being effective to apply each flying capacitor's voltage across a respective one of the reservoir capacitors.

The circuit may be operable such that:
   when in the eighth state the first and third flying capacitor terminals are connected to the input terminal and the second and fourth flying capacitor terminals are connected to the common terminal, and
   when in the second state, the first and second flying capacitor terminals are connected to the first output terminal and the common terminal respectively, and the third and fourth flying capacitor terminals are connected to the common terminal and the second output terminal respectively or the third and fourth flying capacitor terminals are connected to the first output terminal and the common terminal respectively, and the first and second flying capacitor terminals are connected to the common terminal and the second output terminal respectively.

Also disclosed is an audio apparatus including a charge pump circuit as disclosed herein, the charge pump having a flying capacitor connected to the first and second flying capacitor terminals and first and second reservoir capacitors connected respectively between the first output terminal and the common terminal and the second output terminal and the common terminal, the audio apparatus further comprising audio output circuitry connected to be powered by the first and second output voltages of the converter. The audio apparatus may be portable. The audio apparatus may be comprised within a communications apparatus The audio apparatus may be an in-car audio apparatus. The audio apparatus may be comprised within a headphone apparatus or a stereo headphone apparatus. The audio apparatus may include an audio output transducer connected as a load connected to an output terminal of the audio output circuitry In a further aspect of the invention there is provided a method of generating a split-rail voltage supply from a single input supply received across an input terminal and a common terminal, the split-rail supply being output at first and second output terminals connected to the common terminal via respective first and second loads and also via respective first and second reservoir capacitors, the method comprising connecting at two flying capacitors between different ones of the terminals in a sequence of states, so as to transfer packets of charge repeatedly from the input supply to the reservoir capacitors directly or via the flying capacitors and thereby to generate the split rail supply with positive and negative output voltages together spanning a voltage approximately equal to the voltage of the input supply, and centered on the voltage at the common terminal, wherein the different states include a state in which one or both reservoir capacitors are charged by the input supply and a state in which the first and second reservoir capacitors are substantially simultaneously charged from one or both of the first or second reservoir capacitors.

Further optional features of the invention are as disclosed in the appended claims.

BRIEF DESCRIPTION OF THE DRAWINGS

Embodiments of the invention will now be described, by way of example only, by reference to the accompanying drawings, in which.

DETAILED DESCRIPTION OF THE EMBODIMENTS

Figure 1:
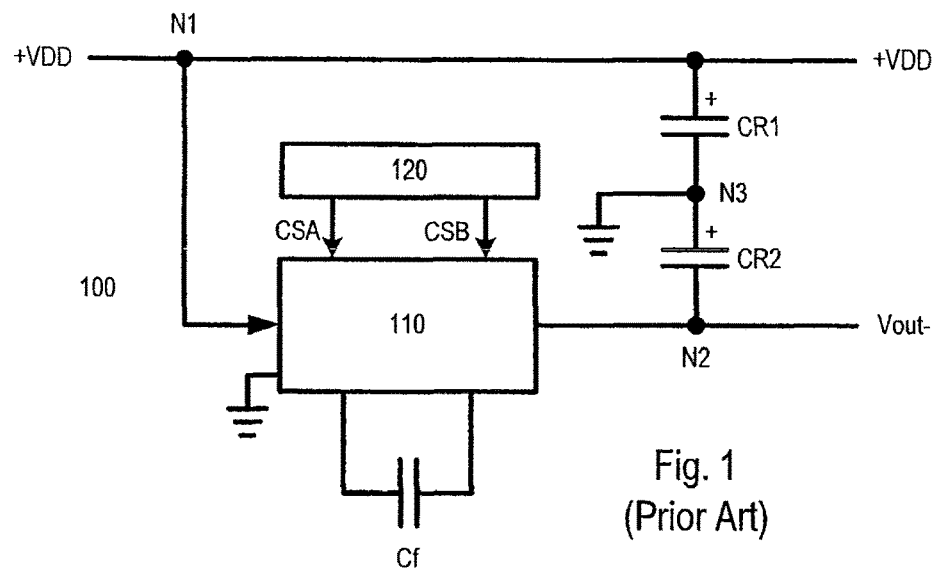
FIG. 1 shows a prior art inverting charge pump circuit.

FIG. 1 illustrates a prior art inverting charge-pump (ICP) circuit 100 which generates a negative output voltage (Vout−) from a positive input voltage (+VDD). In ideal conditions Vout− will substantially equal −VDD thus resulting in a total voltage across the nodes N1-N2 of 2xVDD. The circuit 100 comprises three capacitors, one flying capacitor Cf and two reservoir capacitors CR1, CR2, and a switch array 110. Circuit 100 is controlled by a controller 120 which controls the switch array 110 thus causing circuit 100 to switch between two main states as explained below.

Figure 2A:
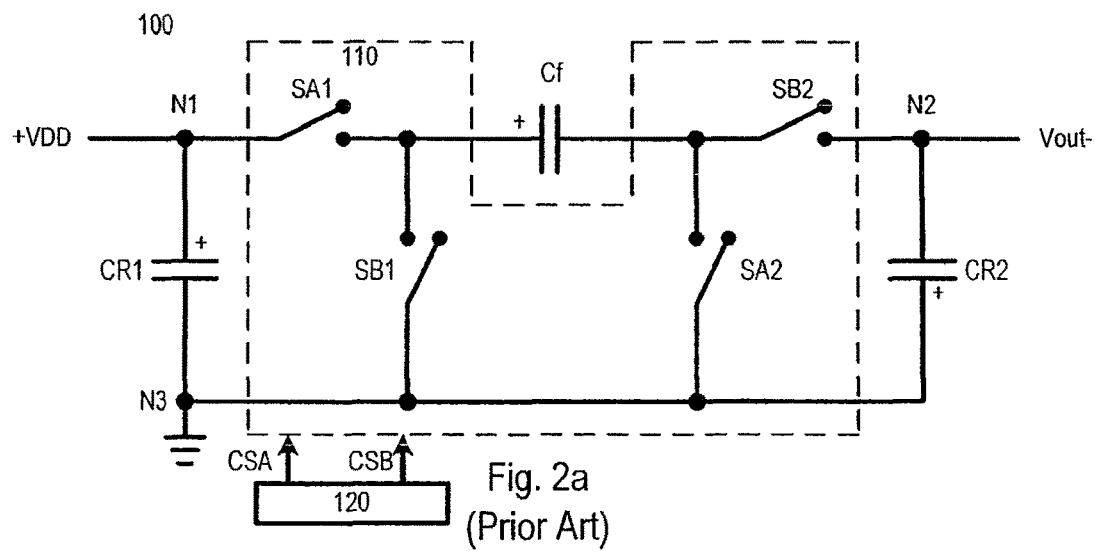
FIG. 2a shows the same circuit as FIG. 1 with detail of the switch array shown.
Figure 2B:
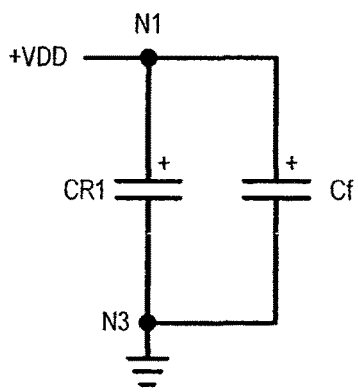
FIGS. 2b and 2c show equivalent circuits of the circuit of FIG. 2a, in two states used in operation.
Figure 2C:
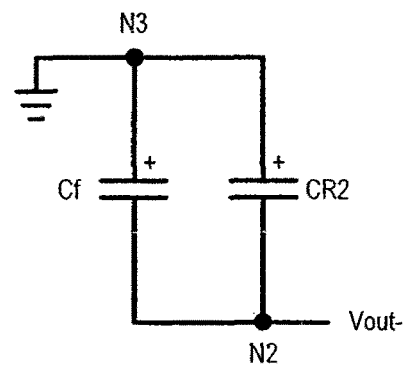

FIG. 2a illustrates the switch array 110 associated with the ICP circuit 100. FIGS. 2b and 2c show equivalent circuits for the two main charging/discharging states of operation. Switches SA1 and SA2 and switches SB1 and SB2 are arranged as shown and respectively operated by common control signals (CSA and CSB).

To generate the voltage Vout−, the controller operates the switch array 110 to repeat the following four steps:

1. initially all the switches are open; then
2. switches SA1 and SA2 are closed (SB1 and SB2 remain open) resulting in the ICP circuit 100 operating in a first state. The flying capacitor Cf is connected between the input voltage node N1 and the common reference voltage node N3 (as illustrated in FIG. 2b). Therefore the flying capacitor Cf charges up to voltage +VDD; then
3. switches SA1 and SA2 are opened (SB1 and SB2 remain open); then
4. switches SB1 and SB2 are closed (SA1 and SA2 remain open) resulting in the ICP circuit 100 operating in a second state. The flying capacitor Cf is now connected in parallel with the negative reservoir capacitor CR2, that is its connected across the common reference voltage node N3 and the output voltage node N2 (as illustrated in FIG. 2c). Assuming capacitor CR2 is initially charged to zero volts in this first cycle, capacitor CR2 will share charge with capacitor Cf, to give an equal voltage across each capacitor. Since the positive plates of capacitors Cf and CR2 are connected to the common reference voltage node N3 (ground), node N2 sees a voltage somewhat more positive than −VDD relative to node N3, depending on the respective sizes of Cf and CR2.

The process repeats itself starting at step 1 when all the switches are open. In each 4-step cycle, capacitor CR2 will be further charged, eventually reaching a steady state after a plurality of 4-step cycles. By this time, capacitor CR2 is already charged to (and therefore Vout− equals) substantially −VDD, and consequently Cf no longer adds any further significant charge.

The switch array 110 may be operated in an open-loop configuration as described above where the switching frequency of the switches is substantially fixed. The actual switching frequency can be made dependent upon the application in which the circuit is being used and can be of the magnitude of KHz to MHz; for example.

If a load is applied to Vout−, it will continuously discharge capacitor CR2. This charge is then replaced by charge from capacitor Cf during state 2, resulting in Vout− being somewhat more positive than −VDD. The average difference and voltage ripple will depend on the values of Cf, CR2, the switching frequency and the load characteristics.

Figure 3:
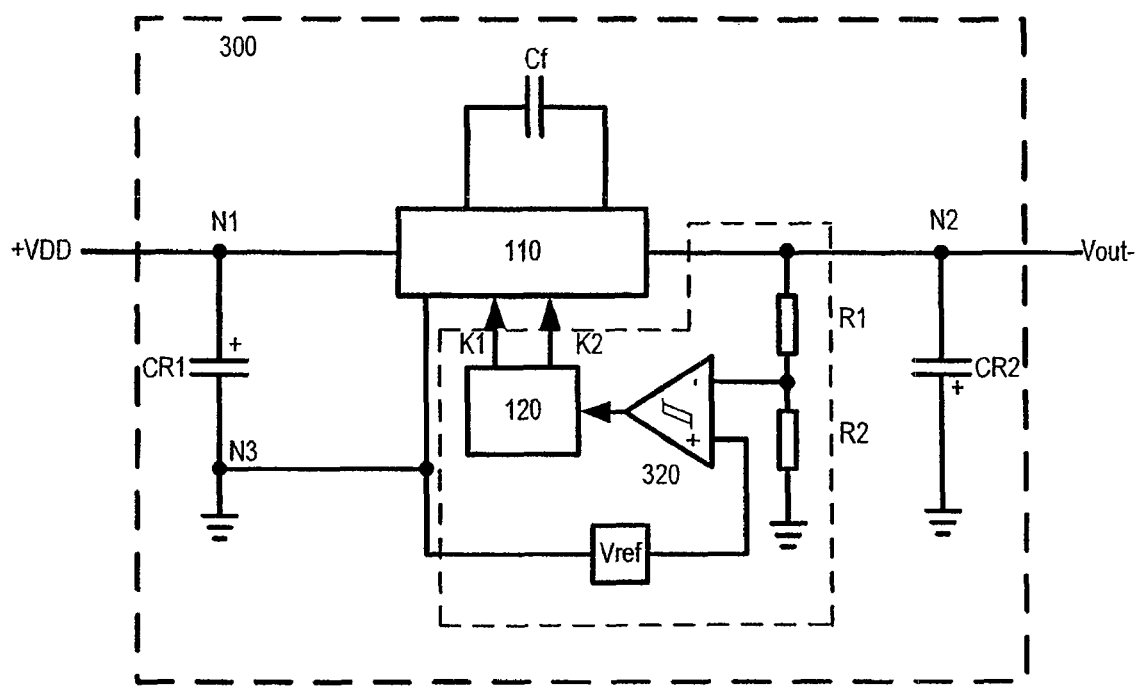
FIG. 3 shows a variation on the circuit of FIG. 1, operating in a closed loop configuration.

FIG. 3 shows an alternative prior art ICP circuit 300 in which the switch array 110 is operated in a closed-loop configuration. This alternative prior art ICP circuit 300 differs from that illustrated in FIG. 1 in having its switch array control logic 310 dependent on output voltage Vout−. The ICP circuit 300 comprises a voltage divider R1, R2 and a comparator 320, as well as the switch array 110 and capacitors Cf, CR1, CR2 as before. Regulation of the output voltage Vout− on node N2 is achieved by sensing the output voltage Vout− through the internal resistor divider R1, R2 and enabling the switch array 110 when the voltage Vout− across capacitor CR2 becomes more positive than the comparator's 320 reference input Vref. When the switch array 110 is enabled, 2-phase non-overlapping clock signals K1, K2 control the switches (not illustrated). One clock signal (K1) controls switches SA1 and SA2 which enables the flying capacitor Cf to charge up to the input voltage +VDD (see FIG. 2b), while the other clock signal (K2) controls switches SB1 and SB2 which enables the output reservoir capacitor CR2 to charge up to voltage Vout− (see FIG. 2c).

It should be noted that the output voltage Vout− can be regulated such that it is anywhere between approximately ground potential and −VDD, however the charge pump itself is most efficient when the output voltage Vout− equals −VDD. In practice the target voltage will probably be set slightly above −VDD in order to reduce ripple.

The problem associated with these prior art ICP circuits (100, 300) is that they can only generate output voltages that have a rail-to-rail magnitude greater than the input voltage. This can be disadvantageous in certain applications, as it may not allow the circuitry being supplied to run efficiently, for example when such an ICP circuit (100, 300) is being used to power circuitry that amplifies a signal with a maximum amplitude much smaller than the amplifier circuitry's power supply +/−VDD.

Figure 4A:
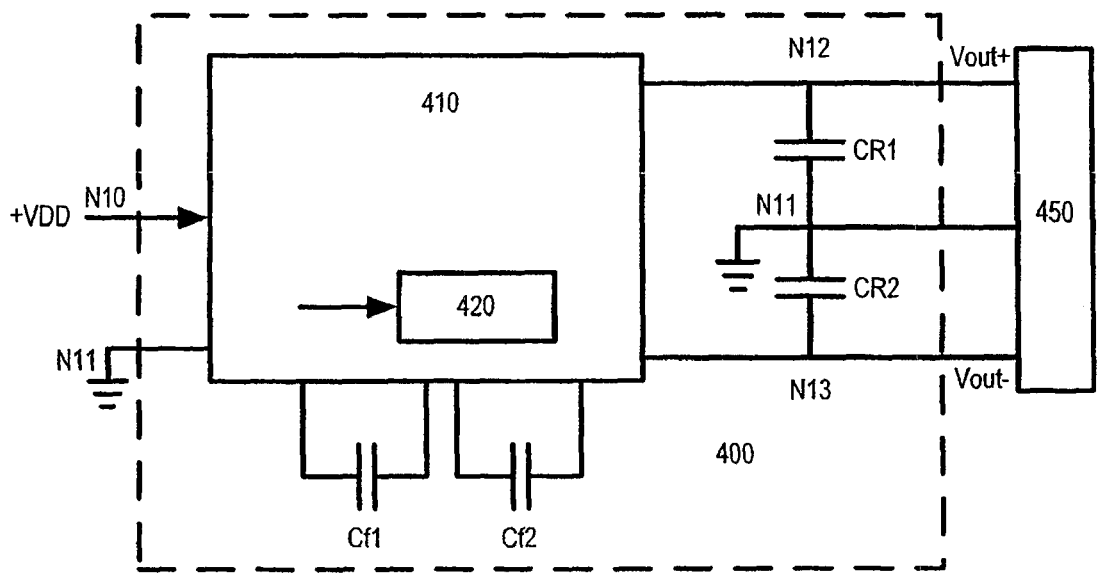
FIG. 4a shows a level shifting charge pump circuit according to an embodiment of the invention.

FIG. 4a is a block diagram of a novel inverting charge pump circuit, which we shall call a Level Shifting Charge-Pump (LSCP) 400. In this circuit there are two reservoir capacitors CR1 and CR2, two flying capacitors Cf1 and Cf2 and a switch array 410 controlled by a switch controller 420 (which may be software or hardware implemented). However in this arrangement reservoir capacitor CR1 is not connected directly to the input supply voltage VDD, but only via the switch array 410. It should be noted that this charge pump 400 is configured as an open-loop charge-pump. Therefore, LSCP 400 relies on the respective loads (not illustrated) at each output N12-N11, N13-N11 remaining within predetermined constraints. The LSCP 400 outputs two voltages Vout+, Vout− that are referenced to a common voltage supply (node N11). The LSCP 400 also has good cross-regulation characteristics.

Connected to the outputs Vout+, Vout−, N11, and shown for illustration only, is a load 450. In reality this load 450 may be wholly or partly located on the same chip as the power supply, or alternatively it may be located off-chip. This concept is considered in further detail when discussing FIGS. 14a and 14b below LSCP 400 operates such that, for an input voltage +VDD, the LSCP 400 generates outputs of magnitude +VDD/2 and −VDD/2, although when lightly loaded, these levels will, in reality, be +/−VDD/2—Iload.Rload, where Iload equals the load current and Rload equals the load resistance. It should be noted that the magnitude (VDD) of output voltage across nodes N12 & N13 is the same, or substantially the same as that of the input voltage (VDD) across nodes N10 & N11.

Figure 4B:
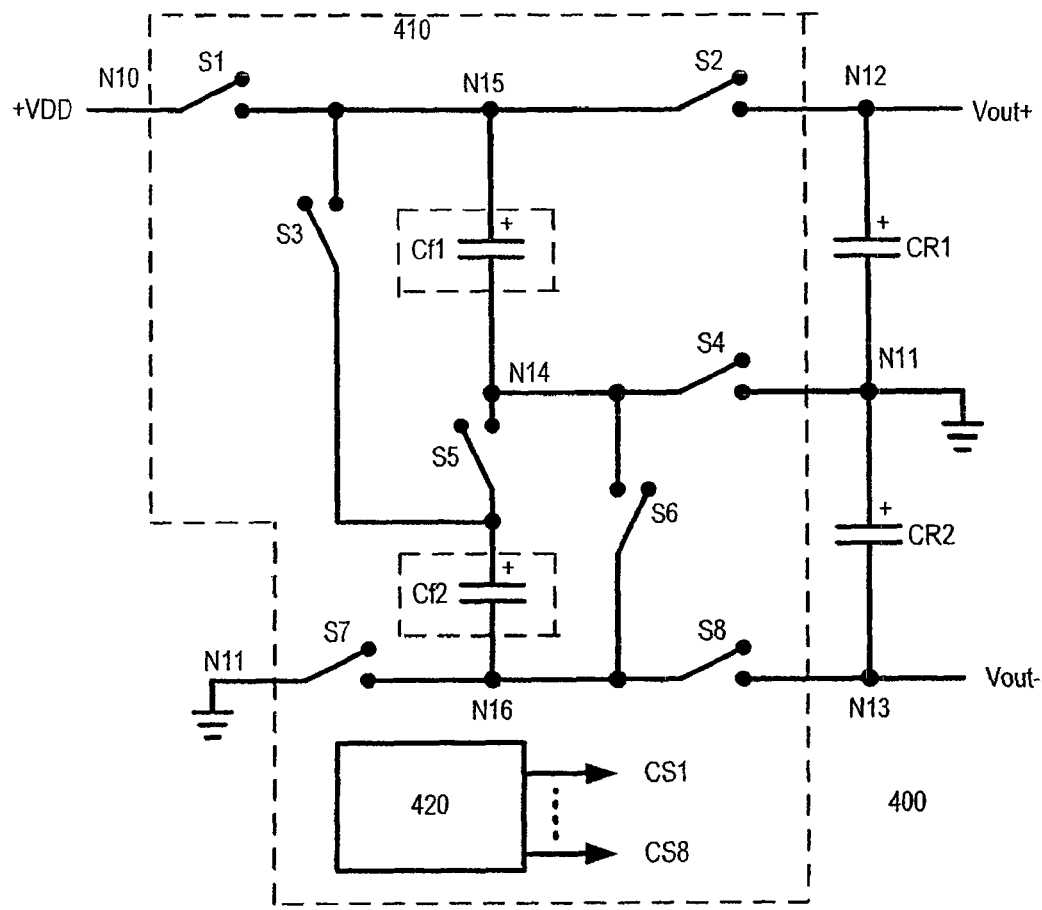
FIG. 4b shows the same circuit as FIG. 4 with detail of the switch array shown.

FIG. 4b shows a more detailed version of the circuit 400 and, in particular, detail of the switch array 410 is shown. The switch array 410 comprises eight switches S1-S8 each controlled by corresponding control signal CS1-CS8 from the switch controller 420. The switches are arranged such that first switch S1 is connected between the positive plate of the first flying capacitor Cf1 and the input voltage source, the second switch S2 between the positive plate of the first flying capacitor Cf1 and first output node N12, the third switch S3 between the positive plate of the flying capacitor and the positive plate of the second flying capacitor Cf2, the fourth switch S4 between the negative plate of the first flying capacitor Cf1 and common terminal N11, the fifth switch S5 between the negative plate of the first flying capacitor Cf1 and the positive plate of the second flying capacitor Cf2, the sixth switch S6 between the negative plate of the first flying capacitor Cf1 and the negative plate of the second flying capacitor Cf2, the seventh switch between the negative plate of the second flying capacitor Cf2 and common terminal N11 and an eighth switch between the negative plate of the second flying capacitor Cf2 and second output terminal N13. It should be noted that the switches can be implemented in a number of different ways (for example, MOS transistor switches or MOS transmission gate switches) depending upon, for example, an integrated circuits process technology or the input and output voltage requirements.

The LSCP 400, in one operational embodiment, has three basic states of operation as shown below.

Figure 5A:
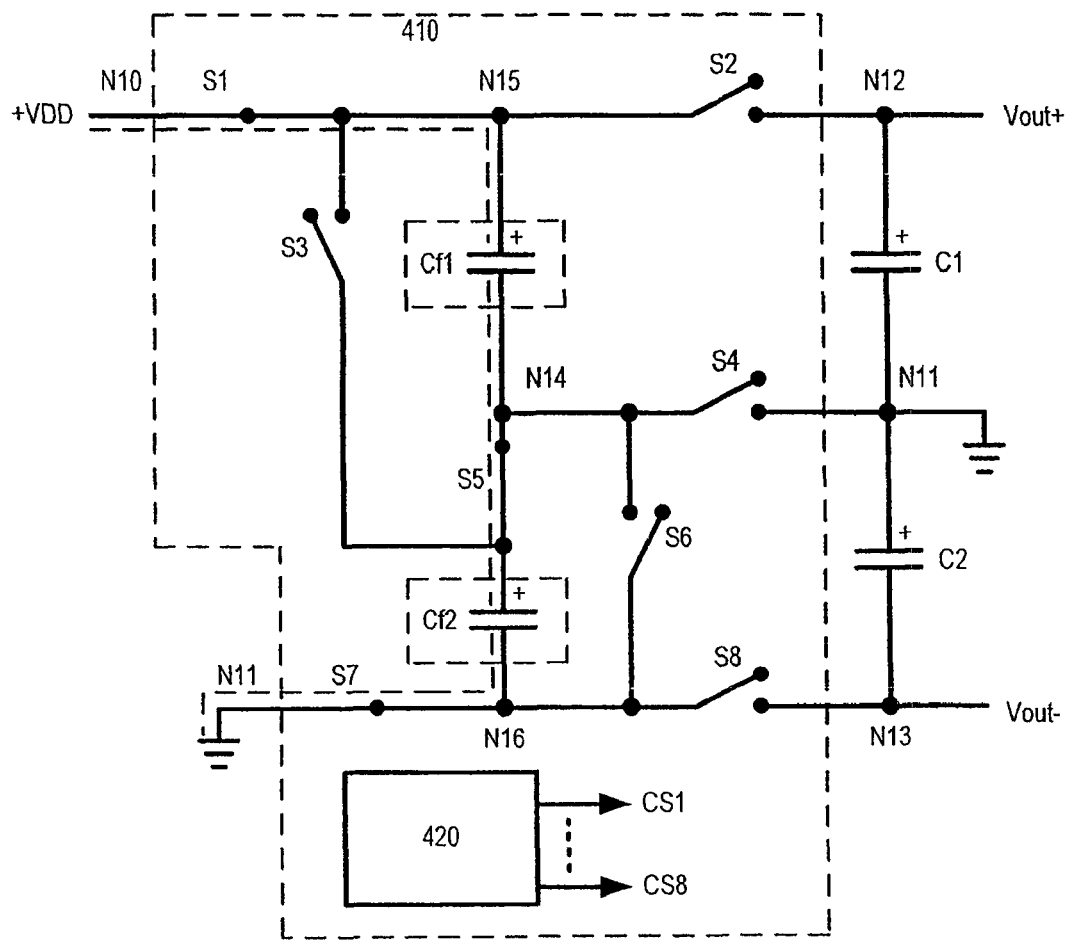
FIGS. 5a and 5b show, respectively, the circuit of FIG. 4 operating in state 1 and an equivalent circuit of this state.
Figure 5B:
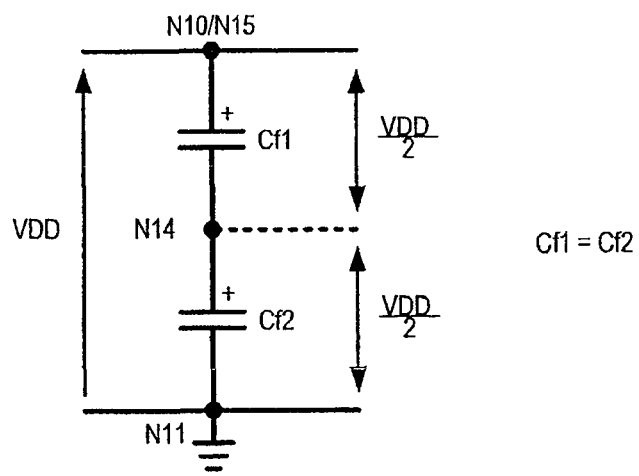

FIGS. 5a and 5b show the switch array 410 operating in a first state, "state 1". Referring to FIG. 5a, switches S1, S5 and S7 are closed such that capacitors Cf1 and Cf2 are connected in series with each other and in parallel with the input voltage +VDD (NW & N11). Therefore, capacitors Cf1 and Cf2 share the input voltage +VDD that is applied across them. FIG. 5b shows an equivalent circuit for this state 1 operation with voltage +VDD effectively applied across nodes N10 & N11.

It is preferable, for applications that require symmetrical, but opposite polarity, output voltages, that the values of capacitors Cf1 and Cf2 are of equal such that each capacitor changes voltage by an equal increment when connected in series across a voltage source. If both capacitors are initially discharged, or indeed previously charged to any equal voltages, they will end up each with a voltage equal to half the applied voltage source, in this case one half of the input voltage VDD.

Figure 6A:
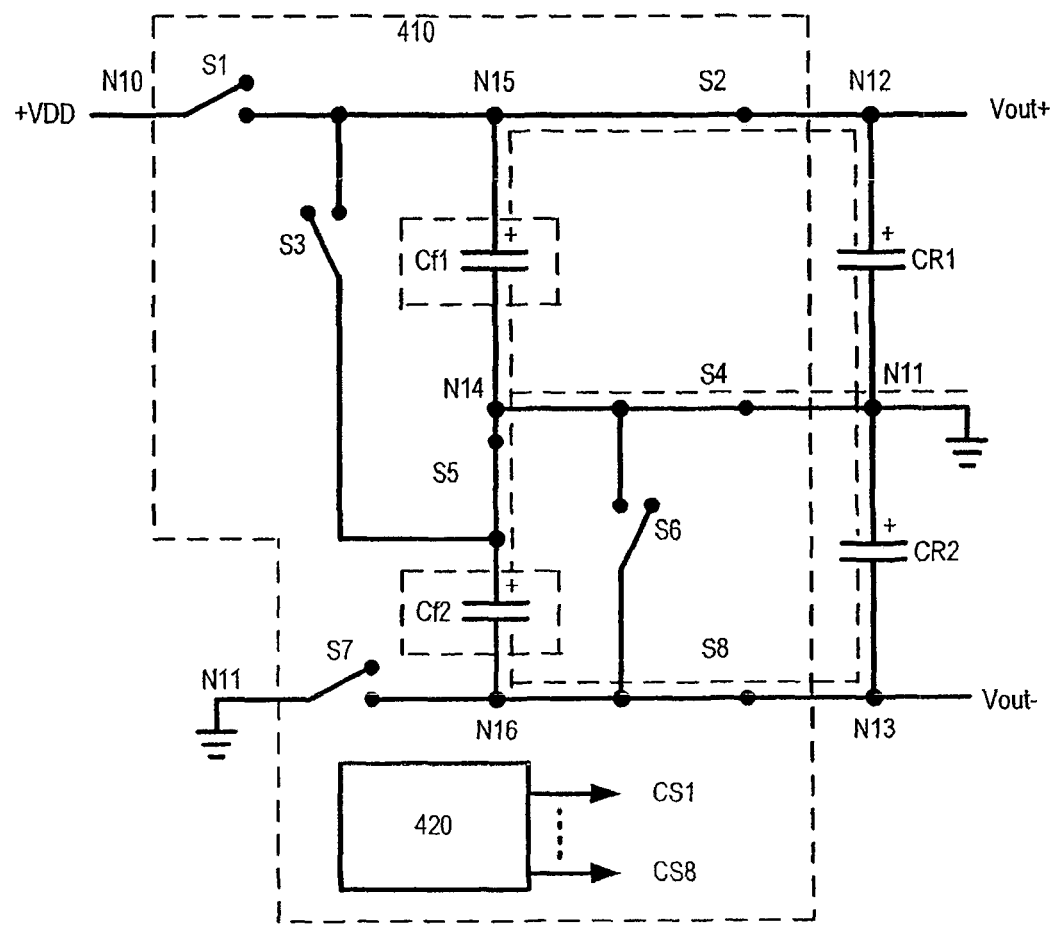
FIGS. 6a and 6b show, respectively, the circuit of FIG. 4 operating in state 2 and an equivalent circuit of this state.
Figure 6B:
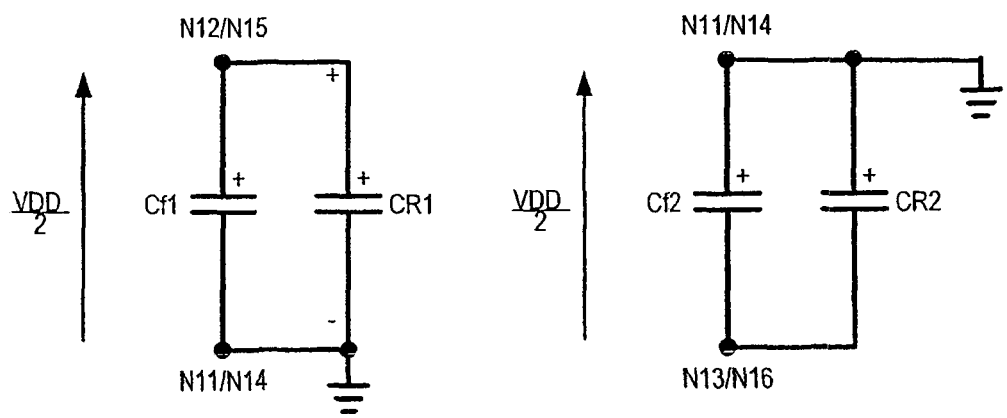

FIGS. 6a and 6b show the switch array 410 operating in a second state, "state 2" Referring to FIG. 6a, switches S2, S4, S5 and S8 are closed such that capacitors Cf1 and CR1 and Cf2 and CR2 are respectively connected in parallel with each other. Therefore, the voltage across capacitor Cf1 equalises with that across capacitor CR1. Over a plurality of state sequences, the voltages across capacitors Cf1, CR1 will converge to a voltage VDD/2. Similarly, the voltages across capacitors Cf2 and CR2 will also equalise and eventually converge to VDD/2. FIG. 6b shows equivalent circuits for this state 2 operation.

It should be noted that the value of reservoir capacitors CR1 and CR2 do not necessarily need to be the same as that of flying capacitors Cf1 and Cf2. If capacitor CR1 and/or CR2 is much larger than capacitor Cf1 and/or Cf2, they will require more state sequences to charge up to, or close to, VDD/2. The value of reservoir capacitors CR1, CR2 should be chosen depending upon expected load conditions and required operating frequency and output ripple tolerance.

As with the prior art charge pump 100 described above, the presence of a significant load on the LSCP's 400 output terminals will result in a voltage droop in Vout+, Vout− away from +/−VDD/2. If the load is symmetric, that is there is equal current magnitude on both Vout+ and Vout−, then the symmetry of the system will result in both outputs drooping by the same amount.

However, if for example there is a significant load on Vout+ but no load or a light load on Vout−, then the voltage across capacitor CR1 will reduce, while that across CR2 will remain the same, or substantially the same. This will result in a reduction in the voltage across Cf1 during state 2. As a result of this there will be a larger voltage across capacitor Cf2 at the end of state 1, which will then be applied to CR2 in state 2, while at the same time, capacitor Cf1 will again be connected in series with capacitor CR1, but still having a smaller voltage across it, even initially. Therefore, the output voltages Vout+ and Vout− will both tend to droop negatively, that is to say, the common mode is not controlled.

To avoid this effect, a third state of operation is introduced.

Figure 7A:
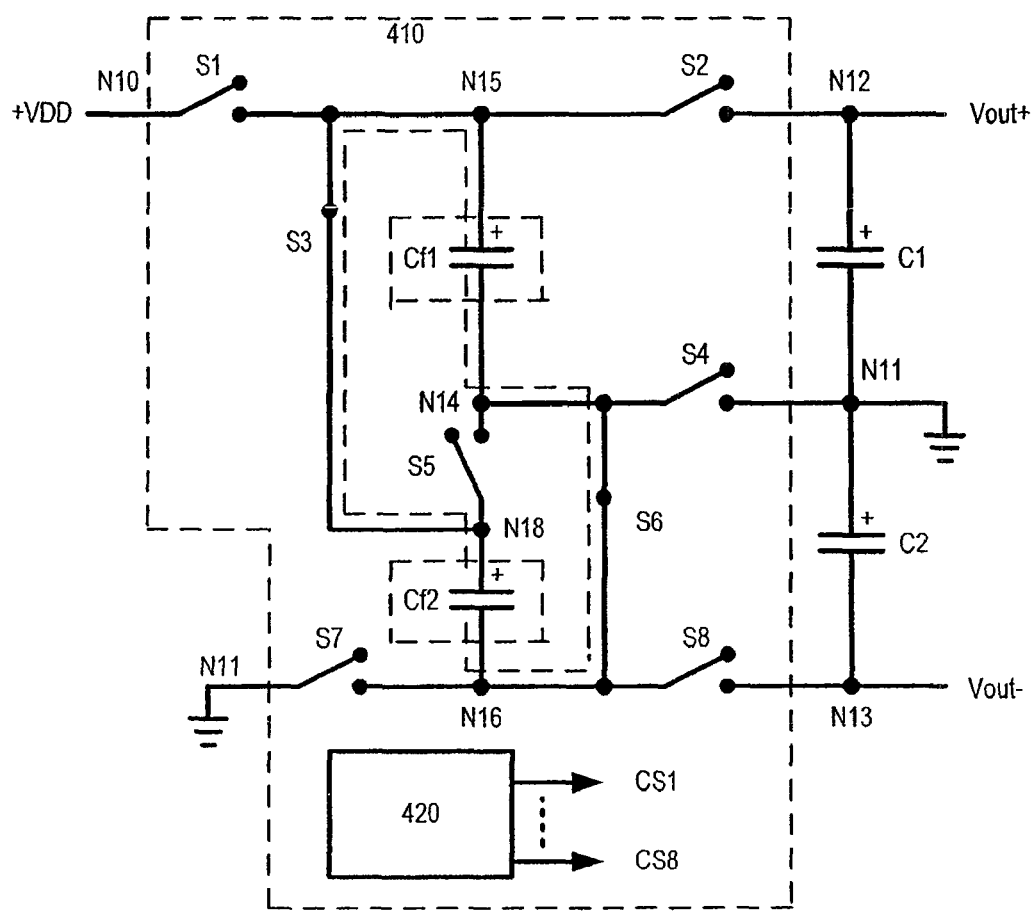
FIGS. 7a and 7b show, respectively, the circuit of FIG. 4 operating in state 3 and an equivalent circuit of this state.
Figure 7B:
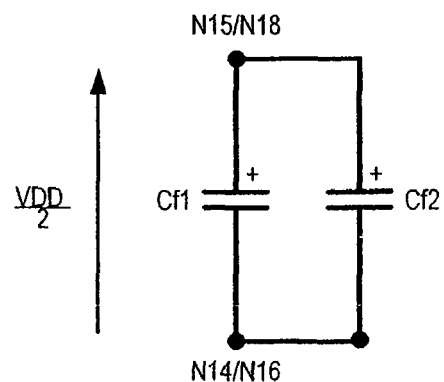

FIGS. 7a and 7b show the switch array 410 operating in this third state, "state 3". Referring to FIG. 7a, switches S3 and S6 are closed such that the two flying capacitors Cf1 and Cf2 are connected in parallel with each other. Both capacitors Cf1 and Cf2 become charged up to an equal voltage, despite any difference between of their previous voltages. In steady state this becomes approximately VDD/2. FIG. 7b shows an equivalent circuit for the state 3 operation.

As mentioned in the previous embodiment, in states 2 and 3, the voltages across the various capacitors that are connected in parallel may not actually completely equalise in practice, particularly if the switching frequency is high relative to the LSCP's 400 R-C time constant. Therefore, the same considerations as in the previous embodiment must be taken into account when considering capacitor sizes so that any reduction in the output voltage remains within acceptable bounds.

It should be appreciated that the open-loop sequencing of the above three states does not necessarily need to be observed. For example the state sequences could be: 1, 2, 3, 1, 2, 3 . . . (as described above); or 1, 3, 2, 1, 3, 2 . . . ; or 1, 2, 1, 3, 1, 2, 1, 3. It should also be apparent that it is not necessary that state 3 be used as often as the other two states, 1 and 2, for instance a sequence of 1, 2, 1, 2, 1, 2, 3, 1 . . . can be envisaged. It may even be envisaged to dispense with state 3 altogether albeit only in the case of well-balanced loads, or with alternative schemes for common-mode stabilisation.

Other switching and sequencing scenarios exist. For example, in one alternative operational embodiment: state 1 could be replaced by another state, "state 4" whereby switches S1 and S4 are closed (all other switches are open) or a fifth state, "state 5" where S1, S3 and S7 are closed. In these states either capacitor Cf1 or Cf2 charges up to input voltage +VDD. A sixth state, "state 6", with S2, S6 and S8 closed (all other switches open) or a seventh state, "state 7", with switches, or S2, S3 or S8 closed would then operate such that the charged flying capacitor Cf1 or Cf2 is connected across reservoir capacitors CR1 and CR2 (which, in this scenario, may be equal in capacitance). It should be noted that this particular example of an alternative switching and sequencing scenario has the drawback that there is no common mode control and therefore such a switching and sequencing scenario would suffer from common mode drift. However, this common mode drift can be "reset" by altering the switching sequence at appropriate intervals during the "normal" switching and sequencing cycle. These alterations can be predetermined, or initiated in response to observed conditions.

Figure 8:
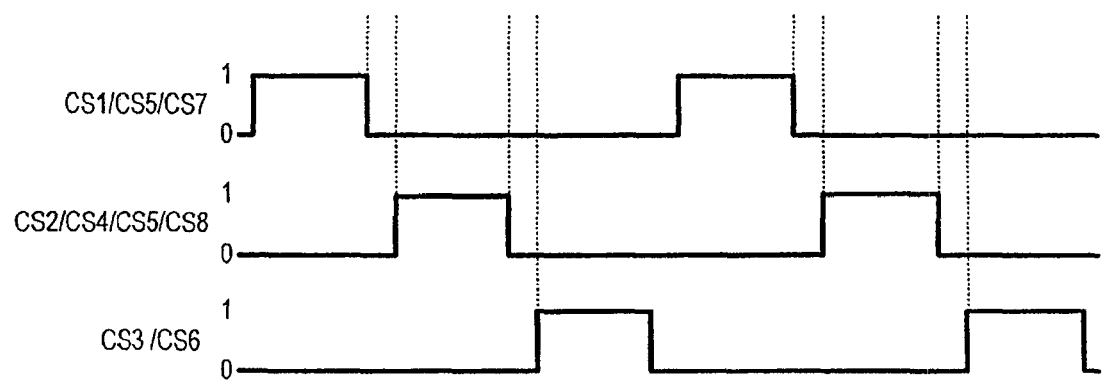
FIG. 8 is a timing diagram showing three switch control signals for the circuit of FIG. 4 operating in an embodiment of the invention.

FIG. 8 illustrates the non-overlapping control signals (CS1-CS8) for controlling the switches (S-S8) during the three states (1, 2 and 3) of the main operational embodiment. As discussed above, this represents only one example out of many possibilities for the controlling sequence.

Figure 9:
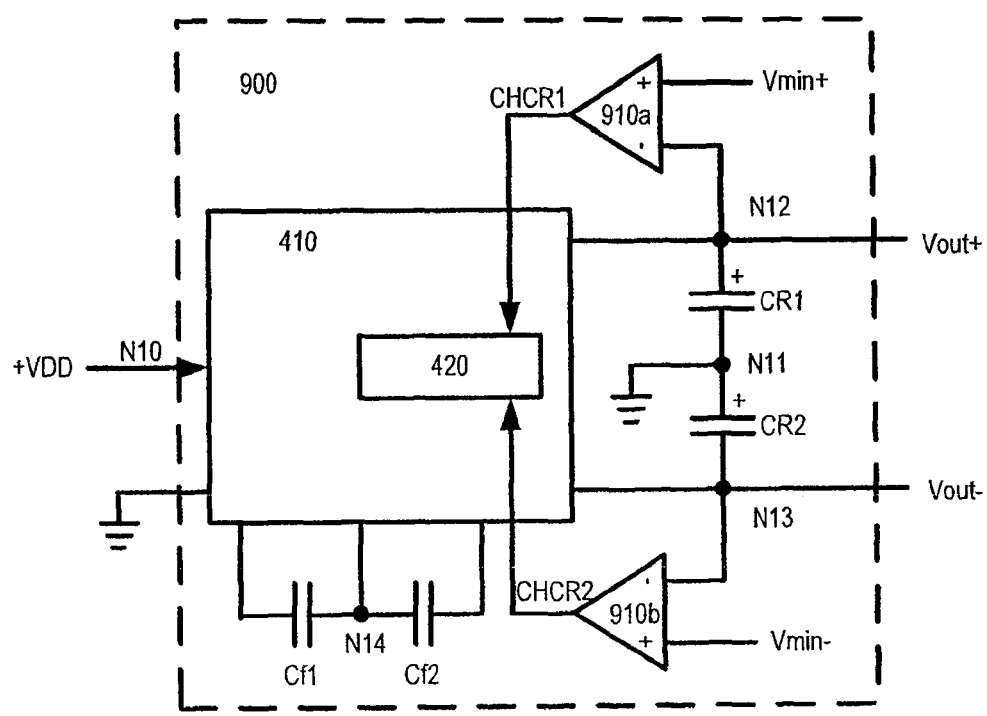
FIG. 9 shows a variation on the circuit of FIG. 4, operating in a closed loop configuration.

FIG. 9 illustrates a closed loop LSCP 900 variation of the LSCP 400. It is largely similar except that the LSCP 900 also includes two comparators 910a, 910b for regulating the two output voltages.

Each of the comparators 910a, 910b compares their respective charge pump output voltages (Vout+, Vout−) with a threshold voltage (Vmin+, Vmin−) and each respective comparator 910a, 910b outputs a respective charge signal CHCR1, CHCR2. These charge signals CHCR1, CHCR2 are fed into the switch control module 420 to control the switch array 410 causing the DMCP to operate charging either the relevant reservoir capacitor. If either output voltage droops past its respective threshold, the charge pump is enabled; otherwise the charge pump is temporarily stopped. This reduces the power consumed in switching the switches, especially in conditions of light load. It is apparent that, as both reservoir capacitors CR1, CR2 are charged in a single state (state 2), that there need only be a single charge signal CHCR which causes the DMCP to charge both reservoir capacitors CR1, CR2.

It should be further noted that in this configuration, the charge pump 400 may be used to generate any required voltages, but with a drop in efficiency. In this case, the reference voltages (Vmin+/Vmin−) can be adjusted to adjust the output voltages accordingly. The flying capacitors Cf1, Cf2 are charged up to +VDD and then each is connected in parallel across one of the reservoir capacitors CR1 or CR2 to raise their voltages to the levels set by the reference voltages. Such an operation increases the ripple voltages on the reservoir capacitors CR1, CR2 but it also reduces switching losses. However, by scaling the reservoir capacitors CR1, CR2 relative to the flying capacitors Cf1, Cf2, the ripple voltages can be reduced.

Figure 10:
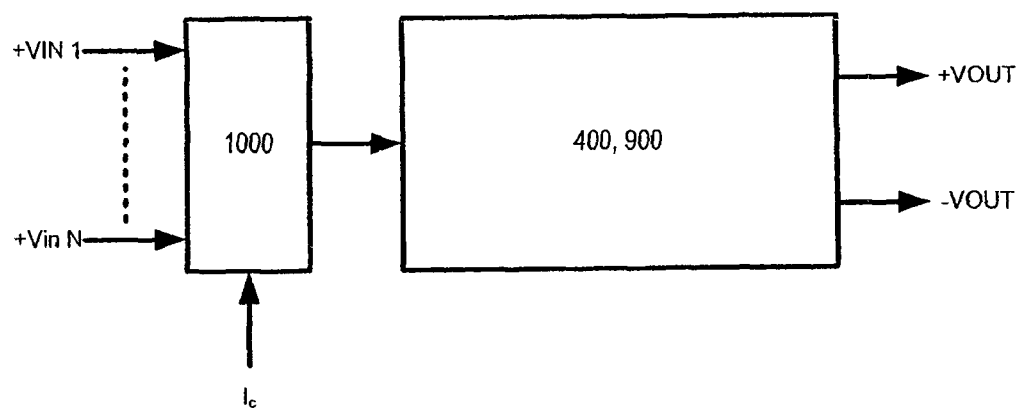
FIG. 10 shows a further embodiment of the invention wherein one of a number of different input voltage values may be selected as an input voltage to the level shifting charge pump.

FIG. 10 illustrates a further embodiment of any of the charge pump circuits embodying the invention wherein one of a number of different input voltage values may be selected as an input voltage to the LSCP 400, 900. It shows an input selector 1000 having a number of different voltage inputs (+Vin 1 to +Vin N), the actual input chosen being determined by control input Ic. The chosen voltage level then serves as the input voltage VDD for the level shifting charge pump 400,900.

Figure 11A:
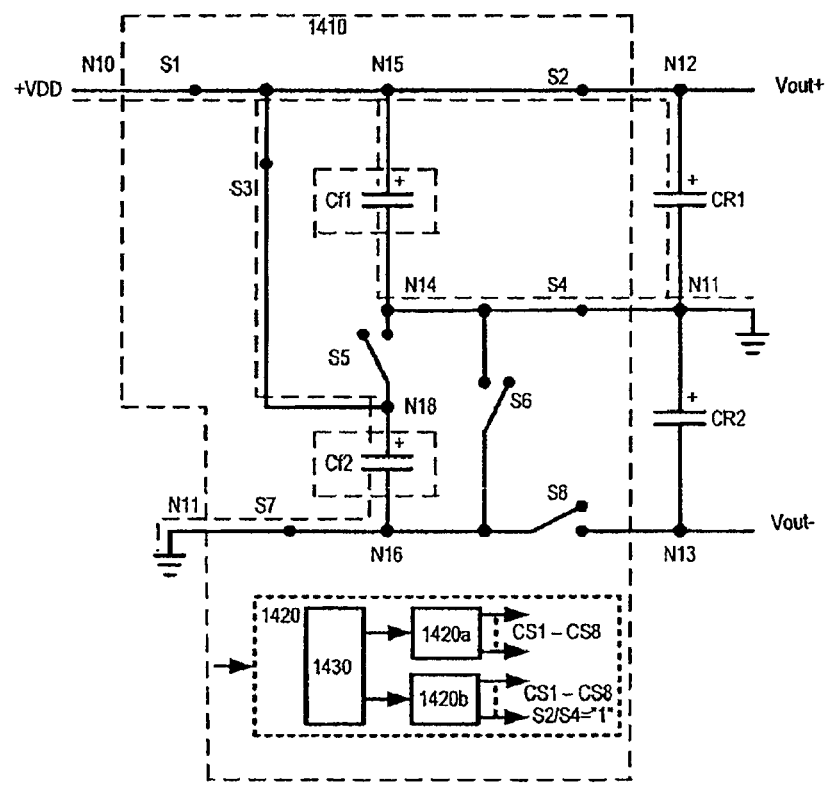
FIGS. 11a and 11b show a dual mode embodiment of the circuit of FIG. 4 operating in state 8 and an equivalent circuit of this state.

The circuit of FIG. 4a/FIG. 9 is also capable of dual mode operation, depending on its controlling circuitry/programming. When configured to be operable in two modes the circuit will be referred to as the Dual-Mode Charge Pump (DMCP) 1400. In this embodiment, there is provided a mode select circuit 1430 within the control module 1420. This mode select circuit 1430, depending on an input control signal Ic, selects one of two switch controller circuits/programs 1420a, 1420b to use, in order to control the switches in one of the two main modes. This mode select circuit can be seen on FIGS. 11a and 11b. Alternatively, the mode select circuit 1430 and the controllers 1420a, 1420b can be implemented in a single circuit block (not illustrated).

The DMCP's two main modes are a first mode where it produces a dual rail output of voltages +/−VDD/2, and a second mode where it produces a dual rail output of +/−VDD (VDD again being the input source voltage level at node N10). As before, the circuit can also produce outputs of any voltages up to these levels if arranged to operate in a closed loop configuration (The implementation of FIG. 9 is equally applicable to this embodiment).

In Mode 1 operation the circuit operates in exactly the same way as described in the embodiments of FIG. 4 and FIG. 9, in order to produce the dual rail output at voltages +/−VDD/2, and will not be described further. In Mode 2 operation the switch array 1410 is operated in a different sequence such that the DMCP 1400 operates as an inverting charge pump such as described with reference to FIG. 1. Also, switches S2 and S4 are permanently closed (which has the effect of permanently connecting flying capacitor Cf1 in parallel with reservoir capacitor CR1) and switch S6 is permanently open.

Figure 11B:
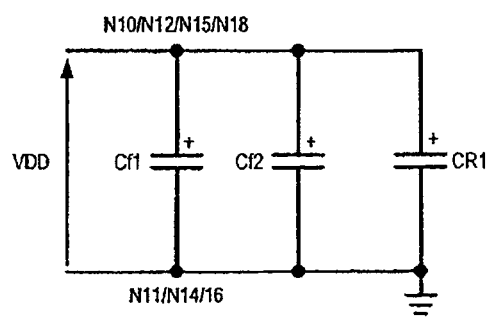

In mode 2 the DMCP 1400 has two basic states of operation. In the first of these states "state 8", shown in FIG. 11a, switches S1, S3 and S7 are closed, as well as the permanently closed S2 and S4. This results in capacitors Cf1, Cf2 and CR1 being connected in parallel across the input voltage +VDD, between nodes N10 & N11 (Cf1 and CR1 are permanently connected in parallel in this mode). Therefore, the three capacitors Cf1, Cf2, CR1 are allowed to charge up to +VDD. FIG. 11b shows an equivalent circuit for this state 8 operation.

Figure 12A:
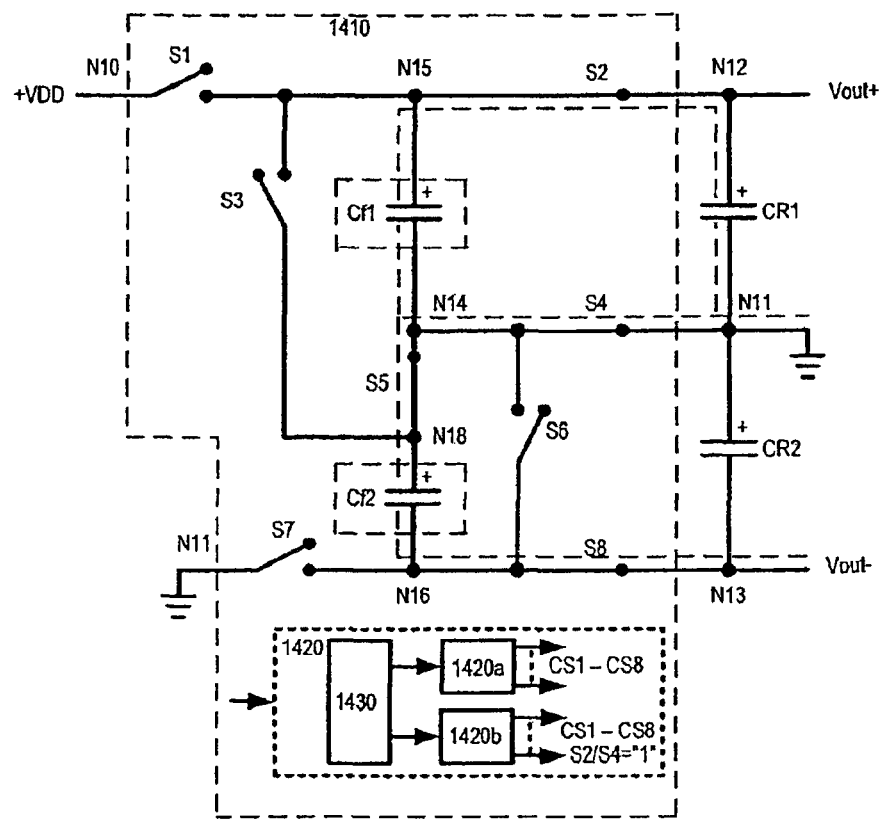
FIGS. 12a and 12b show a dual mode embodiment of the circuit of FIG. 4 operating in state 2 and an equivalent circuit of this state.
Figure 12B:
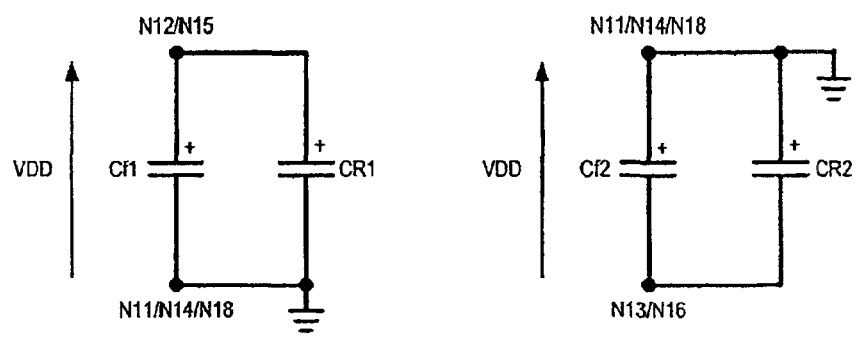

FIG. 12a shows a circuit diagram for the second of these states, "state 2", which is also the second state of mode 1 operation. It can be seen that switches S2, S4, S5 and S8 are closed FIG. 12b shows an equivalent circuit for this state 2 operation. This state 2 is described in detail above. However in this case each flying capacitor Cf1, Cf2 is charged up to +VDD after state 8, and therefore when the voltages across capacitors CR1 and CR2 equalise with their respective flying capacitor Cf1, Cf2, outputs Vout and Vout− will sit at VDD and VDD− respectively.

Figure 13:
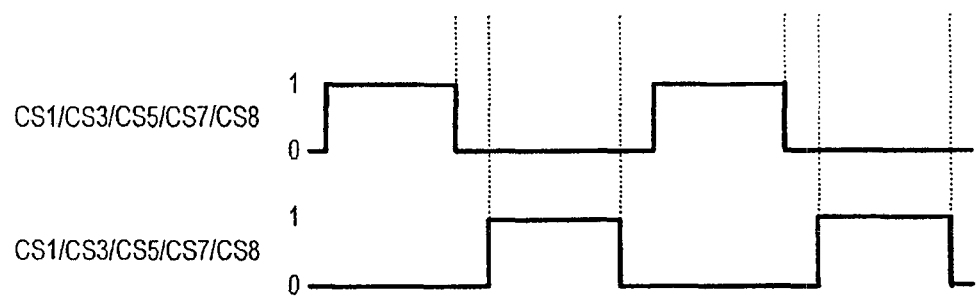
FIG. 13 is a timing diagram showing three switch control signals for the circuit of FIG. 11 operating in an embodiment of the invention.

FIG. 13 illustrates the non-overlapping control signals (CS1-CS8) for controlling the switches (S1-S8) during mode 2. Again, this represents only one example out of many possibilities for the controlling sequence.

TABLE 1

|  | S1 | S2 | S3 | S4 | S5 | S6 | S7 | S8 |
|---|---|---|---|---|---|---|---|---|
| State 1 | 1 | 0 | 0 | 0 | 1 | 0 | 1 | 0 |
| State 2 | 0 | 1 | 0 | 1 | 1 | 0 | 0 | 1 |
| State 3 | 0 | 0 | 1 | 0 | 0 | 1 | 0 | 0 |
| State 4 | 1 | 0 | 0 | 1 | 0 | 0 | 0 | 0 |
| State 5 | 1 | 0 | 1 | 0 | 0 | 0 | 1 | 0 |
| State 6 | 0 | 1 | 0 | 0 | 0 | 1 | 0 | 1 |
| State 7 | 0 | 1 | 1 | 0 | 0 | 0 | 0 | 1 |
| State 8 | 1 | 1 | 1 | 1 | 0 | 0 | 1 | 0 |

Table 1 illustrates the switch (S1-S8) states for the eight states described above, with a "0" representing an open switch and a "1" representing a closed switch. States 1, 2 and 3 are used in the main operational embodiment of the LSCP (mode 1 of the DMCP), while the states 4, 5, 6 and 7 are used in an alternative operational embodiment of same basic mode. States 2 and 8 are used mode 2 of the DMCP. It follows that the switch network and controller do not need to implement all states 1 to 8, if only a subset of the described modes will be used in a particular implementation.

Figure 14A:
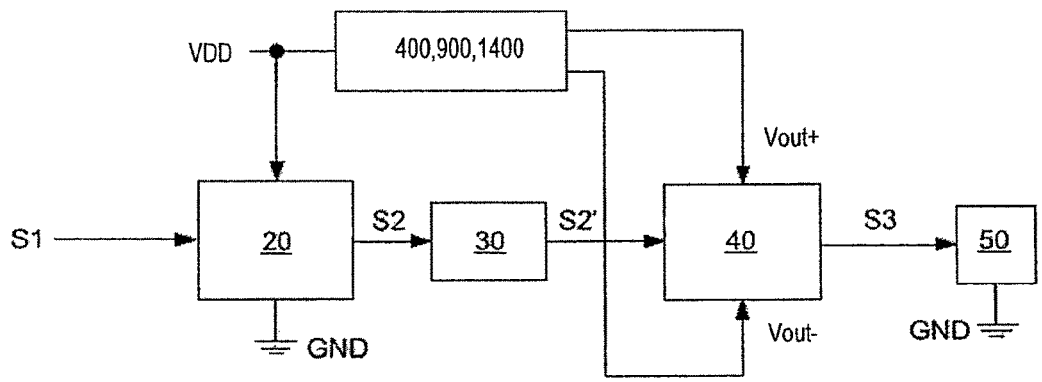
FIGS. 14a and 14b show in block schematic form two amplifier circuits in which the DC-DC converters embodying the present invention may be used.

FIG. 14a represents a typical application wherein dual rail supply voltages Vout+ and Vout− are generated by such a charge pump 400, 900, 1400 as herein described, the charge pump 400, 900, 1400 being supplied from a single rail supply voltage VDD for example. Alternatively, the charge pump 400, 900, 1400 may be supplied by multiple supply voltages as illustrated in FIG. 10. Labels VDD, Vout+ etc. are to be interpreted in the description associated with FIGS. 14a, and 14b, to refer to either the respective terminals or the voltage at that terminal, according to context.

Referring to FIG. 14a, the supply voltage VDD is illustrated as supplying processing circuitry 20. The input signal S1 maybe an analog signal or a digital signal. In the case where S1 is an analog signal then the processing circuitry 20 will be purely analog type circuitry such as op-amps, multiplexers, gain blocks etc. In the case where S1 is a digital signal and the output stage is analog, then the processing circuitry 20 may be a mixture of digital and analog circuitry where signal S1 is fed, either directly or through some digital signal processing, into a DAC (not illustrated) and the output of the DAC is then fed into the analog circuitry as mentioned above.

The processing circuitry 20 outputs a processed signal S2 that in this particular embodiment is an analog signal that is passed into a level shifter 30. Level shifter 30 may be implemented by a DC-blocking capacitor for example. An output amplifier 40 is powered by the dual rail supply voltages Vout+ and Vout− generated by the charge pump 400, 900, 1400, and may, in particular embodiments, be at levels +/−VDD/2 or +/−VDD depending on the charge pump's 1400 mode of operation (where dual mode operation is provided). The mode of operation of charge pump 1400 is determined by control signal Cnl. Mode 1 may be used to drive a low impedance load such as headphones while Mode 2 may be used to drive a high impedance load such as a line output. Mode selection may be carried out manually such as by a volume setting level or code, for example, or alternatively by automatically sensing the output impedance or output current supply or even jack socket versus docking station operation in the case of a portable audio device. In the case of using the volume control to "Mode select", setting the charge pump to Mode 2 should the volume be set high will under normal circumstances cause the output supply voltages to collapse due to the fact that the load's power requirements are greater than that which the charge pump 1400 has been designed for. Nevertheless, safeguards, (for example, to protect against ear damage as a result of dangerously high volumes) in the form of extra circuitry (not illustrated), can be put in place to monitor for such a situation so as to disable the charge 1400 or another part(s) of the circuitry.

The input signal S1, if analog, and analog signals in the processing circuitry 20, will normally be referenced midway between ground potential and VDD, whereas the level shifted signal S2' is referenced about ground, as required by the output amplifier operating from the split rail supply Vout+, Vout−.

The level shifted signal S2' is fed into the output amplifier 40 which outputs an amplified output signal S3 which is fed into a ground referenced load in the form of signal transducer 50. In the case where the output amplifier 40 is a switching (Class D or PWM) amplifier, or a 1-bit digital (sigma-delta) type output stage, the signals S1, S2 may be digital in form right through to input to output, or may begin in analog form and be converted to digital form in the processing circuit 20.

Figure 14B:
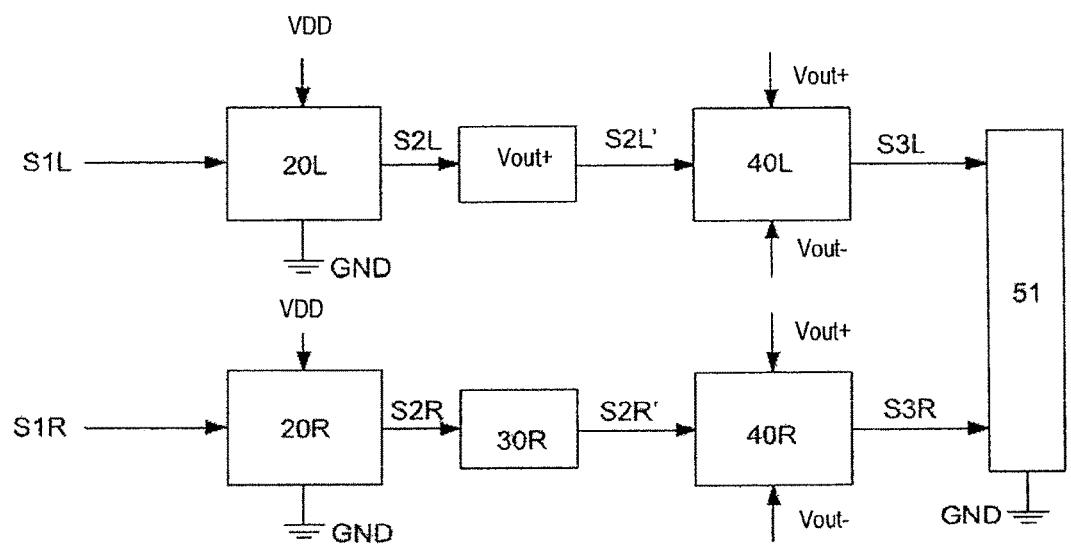

FIG. 14b illustrates a more specific application of the arrangement of FIG. 14a: the charge pump 400, 900, 1400, 1400 and supply connections have been omitted for clarity. The application in this example is a stereo amplifier in which the load is a stereo headphone 51. The signal processing elements of the amplifier are duplicated to process left and right channel signal, as indicated by the suffixes 'L' and 'R' on their reference signs. The supply voltages Vout+ & Vout− can be shared by both channels, although independent supplies for different channels would be possible if the application demands it. One area of application is in portable audio apparatus such as MP3 players for example where the split rail supply allows a DC-coupled output, which is desirable to maintain the bass response without having to use large decoupling capacitors.

Other possible application areas where the ability to generate a split rail supply include: (1) voltage supplies for circuits handling analog composite video signals, where a ground-referenced DC-coupled output signal can avoid black-level droop; and (2) line drivers for data links or modems such as ADSL where a ground-referenced DC-coupled output signal can reduce baseline wander effects.

For cost and size reasons, it is important to be able to integrate the functions of an MP3 player, mobile phone or any other application into a small number of integrated circuits. Therefore it is advantageous to integrate the circuitry for supply voltage generation, in this case the charge pump 400, 900, 1400, together with the functional circuitry 20, 30, 40 etc. Generally speaking, the charge pump 400, 900, 1400 includes a capacitor which cannot realistically be integrated and has to be located off-chip, with consequences for chip-pin-count and overall circuit size. Since many circuits require supplies of dual polarity (split rail supplies), this has prompted the development of voltage generation circuits that are capable of generating two (or more) output voltage supplies using a single capacitor, rather than a capacitor per required output voltage.

Many other modifications in the control scheme, the form of the controller and even specifics of the switch network may be varied. The skilled reader will appreciate that the above and other modifications and additions are possible to these circuits, without departing from the spirit and scope of the invention as defined in the appended claims. Accordingly, the above described embodiments are presented to illustrate rather than limit the scope of the invention. For interpreting this specification and claims, the reader should note that the word "comprising" does not exclude the presence of elements or steps other than those listed in a claim, the singular article "a" or "an" does not exclude a plurality, and a single element may fulfil the functions of several elements recited in the claims. Any reference signs in the claims shall not be construed so as to limit their scope.

Where a claim recites that elements are "connected" or are "for connecting", this is not to be interpreted as requiring direct connection to the exclusion of any other element, but rather connection sufficient to enable those elements to function as described. The skilled reader will appreciate that a good, practical design might include many auxiliary components not mentioned here, performing, for example, start-up and shutdown functions, sensing functions, fault protection or the like, some of which have been mentioned already, and none of which detract from the basic functions characteristic of the invention in its various embodiments described above in the claims.

Labels Vout+, Vout− and VDD etc. are to be interpreted in throughout the above description to refer to either the respective terminals or the voltage at that terminal, according to context.

In addition to variations and modifications within the charge pump circuit itself, the invention encompasses all manner of apparatuses and systems incorporating the charge pump, besides the amplifier application illustrated in FIG. 14. The circuit may be used to power output stages of all manner of apparatus, including communications apparatus, where the output stage may drive an antenna or transmission line, an electro-optical transducer (light emitting device) or an electromechanical transducer.

What is claimed is:

1. A charge pump circuit comprising:
an input terminal for receiving an input voltage;
first and second output terminals for connection to respective first and second reservoir capacitors and for outputting respective positive and negative output voltages;
first and second flying capacitor terminals for connection to a first flying capacitor;
third and fourth flying capacitor terminals for connection to a second flying capacitor;
a switch network connected to said input terminal, a common terminal, said first and second output terminals and said first, second, third and fourth flying capacitor terminals;
a switch controller configured to control said switch network in a sequence of states so as to generate said positive and negative output voltages at said first and second output terminals respectively,
wherein said switch controller is operable to control the switch network to adopt a first state in which the first and second flying capacitor terminals are connected to the first and second output terminals respectively such that the first flying capacitor is connected between said first and second output terminals.

2. A charge pump circuit as claimed in claim 1 wherein in said first state the third and fourth flying capacitor terminals are also connected to the first and second output terminals respectively such that second flying capacitor is also connected between said first and second output terminals.

3. A charge pump circuit as claimed in claim 2 wherein in said second state the first and second flying capacitors are connected in series with one another and connected between the input terminal and a common terminal.

4. A charge pump circuit as claimed in claim 1 wherein the switch controller is further operable to control the switch network to adopt a second state in which said first and second flying capacitors are connected in series with one another and connected to the input terminal.

5. A charge pump circuit as claimed in claim 4 wherein in said second state the first, second, third and fourth flying capacitor terminals are disconnected from the first and second output terminals.

6. A charge pump circuit as claimed in claim 1 wherein the switch controller is further operable to control the switch network to adopt a third state in which the first and third flying capacitor terminals are connected together and the second and fourth flying capacitor terminals are connected together such that the first and second flying capacitors are connected in parallel with one another and the first, second, third and fourth flying capacitor terminals are disconnected from the input terminal and from the first and second output terminals.

7. A charge pump circuit as claimed in claim 1 wherein the switch controller is operable in a first mode of operation to control said switch network in a first sequence of states including said first state and is further operable in second mode of operation to control said switch network in a second, different, sequence of states.

8. A charge pump circuit as claimed in claim 7 wherein in said first mode of operation the positive and negative output voltages have a first magnitude and in the second mode of operation the positive and negative output voltages have a second, different, magnitude.

9. A charge pump circuit as claimed in claim 8 wherein the first magnitude is equal to half the magnitude of the input voltage.

10. A charge pump circuit as claimed in claim 1 wherein said switch network comprises:
a first switch for connecting the input terminal to the first flying capacitor terminal;
a second switch for connecting the first flying capacitor terminal to the first output terminal;
a third switch for connecting the first flying capacitor terminal to the third flying capacitor terminal;
a fourth switch for connecting the second flying capacitor terminal to the common terminal;
a fifth switch for connecting the second flying capacitor terminal to the third flying capacitor terminal;
a sixth switch for connecting the second flying capacitor terminal to the fourth flying capacitor terminal;
a seventh switch for connecting the fourth flying capacitor terminal to the common terminal; and
an eighth switch for connecting the fourth flying capacitor terminal to the second output terminal.

11. A charge pump circuit as claimed in claim 10 wherein, in the first state, the second switch, the sixth switch and the eighth switch are all closed.

12. A charge pump circuit as claimed in claim 10 wherein, in the first state, the first, third, fourth, fifth and seventh switches are all open.

13. A charge pump circuit as claimed in claim 1 wherein the circuit is configured to alter the sequence of states in response to the operating conditions of the charge pump circuit.

14. A charge pump circuit as claimed in claim 1 comprising a first reservoir capacitor connected to said first output terminal, a second reservoir capacitor connected to said second output terminal, a first flying capacitor connected between said first and second flying capacitor terminals and a second flying capacitor connected between said third and fourth flying capacitor terminals.

15. An electronic device comprising a charge pump circuit as claimed in claim 1.

16. A charge pump circuit comprising:
an input terminal for receiving an input voltage;
first and second output terminals for connection to respective first and second reservoir capacitors and for outputting respective positive and negative output voltages;
first and second flying capacitor terminals for connection to a first flying capacitor;
third and fourth flying capacitor terminals for connection to a second flying capacitor;
a switch network connected to said input terminal, a common terminal, said first and second output terminals and said first, second, third and fourth flying capacitor terminals;
a switch controller for controlling said switch network, wherein:
said switch controller is operable to control the switch network to adopt a first state in which the first flying capacitor terminal is connected to the input terminal and the second flying capacitor terminal is connected to the third flying capacitor terminal; and
said switch controller is also operable to control the switch network to adopt a second state in which the first and second flying capacitor terminals or the third and fourth flying capacitor terminals are connected to the first and second output terminals respectively such that one of the first and second flying capacitors terminal is connected between the first and second output terminals.

17. A charge pump circuit as claimed in claim 16 wherein the switch controller is operable in a first mode of operation to control said switch network in a first sequence of states including said first state and said second state and is further operable in second mode of operation to control said switch network in a second, different, sequence of states.

18. A charge pump circuit as claimed in claim 17 wherein in said first mode of operation the positive and negative output voltages have a first magnitude and in the second mode of operation the positive and negative output voltages have a second, different, magnitude.

19. A charge pump circuit comprising:
an input for receiving an input voltage;
a first output for outputting a positive output voltage;
a second output for outputting a negative output voltage;
first and second flying capacitors;
a switch network operable in a plurality of different switching states; and
a controller for controlling the switch network to provide a first switching state in which said first flying capacitor is connected across the first and second outputs such that a voltage difference between the first and second outputs is equal to a voltage of the first flying capacitor.

* * * * *